United States Patent Office
3,427,385
Patented Feb. 11, 1969

3,427,385
METHOD OF CONTROLLING AND
ERADICATING MITES
Yuzuru Uebayashi, Oiso-machi, Reiji Sakimoto, Takaoka-shi, Keiichiro Ishii, Tokyo-to, Mitsuo Asada, Kanagawa-ken, and Takuzo Taniguchi, Kamakura-shi, Japan, assignors to Nippon Soda Kabushiki Kaisha, Tokyo-to, Japan, a company of Japan
No Drawing. Continuation-in-part of application Ser. No. 300,917, Aug. 8, 1963. This application Jan. 26, 1966, Ser. No. 523,035
U.S. Cl. 424—226      9 Claims
Int. Cl. A01n 9/12

This is a continuation-in-part of application Ser. No. 300,917, filed Aug. 8, 1963, now abandoned.

The invention relates to the use of azo-sulfide compounds as agricultural miticides. The azo-sulfide compounds of the present invention have the following formula:

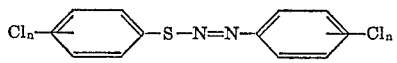

wherein $n$ represents numerals from 0 to 5.

The novel compounds of this invention are prepared by the reaction of chlorothiophenol having the formula:

wherein $n$ represents 0, 1, 2, 3, 4 or 5 with chlorophenyl diazonium salt having the formula:

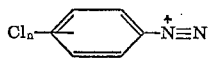

wherein $n$ has the same meaning, in an aqueous solution.

The following examples illustrate certain of the many specific embodiments of the invention.

EXAMPLE I 4-chlorophenylazo-4'-chlorophenylsulfide (compound No. I in Table I)

4.3 g. of 4-chloroaniline were added to the solution of 14 ml. of 35% hydrochloric acid in 14 ml. of water. Then, the aqueous solution of 2.3 g. of NaNO₂ in 8 ml. of water was added to the mixture at the temperature of 0 to 2° C.

The thus obtained diazonium solution was added dropwise to the solution of 4.8 g. 4-chlorothiophenol and 8 g. of NaOH in 150 ml. of water at 0 to 5° C.

A precipitate formed, which was recovered by filtration, washed with water and recrystallized from acetone. 9.5 g. of yellow needles, M.P. 94° C. (decompd.), were obtained.

Analysis.—Calculated for $C_{12}H_8Cl_2N_2S$: N, 9.89%. Found: N, 10.25%.

EXAMPLE II

Phenylazo-2,4-dichlorophenylsulfide (compound No. III in Table I)

By the reaction of the solution of 2.7 g. of aniline and 10 ml. of 35% hydrochloride in 10 ml. of water with the aqueous solution of 2 g. of NaNO₂, the solution of the diazonium salt was obtained. To the alkaline solution of 5.3 g. of 2,4-dichlorothiophenol and 7 g. of NaOH in 150 ml. of water, the solution of the diazonium salt was added. A precipitate formed was collected, washed and recrystallized. 3.8 g. of yellow needles, M.P. 81° C. (decompd.), were obtained.

Analysis.—Calculated for $C_{12}H_8Cl_2N_2S$: N, 9.89%. Found: N, 10.51%.

EXAMPLE III 4-chlorophenylazo-2',4',5'-trichlorophenylsulfide (compound No. II in Table I)

By the reaction of the solution of 4.3 g. of 4-chloroaniline and 14 ml. of 35% HCl in 14 ml. of water with the aqueous solution of 2.3 g. of NaNO₂, the solution of the diazonium salt was obtained. To the alkaline solution of 7 g. of 2,4,5-trichlorothiophenol and 8 g. of NaOH in 150 ml. of water, the solution of the diazonium salt was added.

The precipitate formed was collected, washed and recrystallized. 10.3 g. of yellow needles, M.P. 119 to 120° C. (decompd.), were obtained.

Analysis.—Calculated for $C_{12}H_6Cl_4N_2S$: N, 7.95%. Found: N, 7.53%.

EXAMPLE IV 2,4,5-trichlorophenylazo-4'-chlorophenylsulfide (compound No. VII in Table I)

By the reaction of the solution of 2.5 g. of 2,4,5-trichloroaniline and 10 ml. of 35% HCl in 10 ml. of water with an aqueous solution of 0.9 g. of NaNO₂, the solution of the diazonium salt was obtained. The solution was added to an alkaline solution of 1.9 g. of 4-chlorothiophenol and 1.9 g. of NaOH in 50 ml. of water. The resulting precipitate was collected, washed and recrystallized, and 4 g. of yellow needles, M.P. 114 to 115° C. (decompd.), were obtained.

Analysis.—Calculated for $C_{12}H_6Cl_4N_2S$: N, 7.95%. Found: N, 7.53%.

EXAMPLE V 4-chlorophenylazo 2',3',4',5',6'-pentachlorophenylsulfide (compound No. VIII in Table I)

The solution of the diazonium salt which was obtained by the reaction of 2.1 g. of 4-chloroaniline and 7 ml. of 35% HCl in 7 ml. of water with an aqueous solution of 1.2 g. of NaNO₂, was added to an alkaline solution of 4.7 g. of pentachlorothiophenol and 4 g. of NaOH in 75 ml. of water.

The resulting precipitate was collected, washed with water and recrystallized from acetone, 3.5 g. of yellow needles, M.P. 105 to 106° C. (decompd.), were obtained.

Analysis.—Calculated for $C_{12}H_4Cl_6N_2S$: N, 6.65%. Found: N, 7.02%.

Typical examples of the compounds are listed in Table I on the following page.

TABLE I

| No. | Formula | Substance | M.P., °C |
|---|---|---|---|
| I | Cl—⟨⟩—S—N=N—⟨⟩—Cl<br>4-chlorophenyl-azo-4'-chloro-phenyl-sulfide | Yellow crystals | 94 (decomp.) |
| II | Cl—⟨Cl,Cl⟩—S—N=N—⟨⟩—Cl<br>4-chlorophenyl-azo-2',4',5'-tri-chlorophenyl-sulfide | do | 119–120 (decomp.) |
| III | Cl—⟨Cl⟩—S—N=N—⟨⟩<br>Phenyl-azo-2',4'-dichlorophenyl-sulfide | do | 81 (decomp.) |
| IV | Cl—⟨Cl⟩—S—N=N—⟨⟩—Cl<br>4-chlorophenyl-azo-2',4'-dichlorophenyl-sulfide | do | 98 (decomp.) |
| V | Cl—⟨Cl,Cl⟩—S—N=N—⟨⟩<br>Phenyl-azo-2',4',5'-trichloro-phenyl-sulfide | do | 89–90 (decomp.) |
| VI | ⟨⟩—S—N=N—⟨⟩—Cl<br>4-chlorophenyl-azo-phenyl-sulfide | do | 57–58 (decomp.) |
| VII | Cl—⟨⟩—S—N=N—⟨Cl,Cl⟩—Cl<br>2,4,5-trichlorophenyl-azo-4'-chlorophenyl-sulfide | do | 114–115 (decomp.) |
| VIII | Cl—⟨Cl,Cl⟩—S—N=N—⟨Cl,Cl⟩—Cl<br>4-chlorophenyl-azo-2',3',4',5',6'-pentachlorophenyl-sulfide | do | 105–106 (decomp.) |

The compounds listed in Table I possess excellent ovicidal and larvicidal activities against spider mites, especially against phytophagous mites.

Agricultural miticidal compositions of the compounds may be applied in any convenient form. For instance, they may be dissolved or emulsified in solvents or water to be applied as a spray, and they may be combined with dry inert carriers to be applied as a dry powder or a wettable powder.

In the following examples, the effect of treatment of infested plants with the compounds according to the invention is illustrated.

EXAMPLE VI

Potted bean plants of from 7 to 10 days old infested with 30 adult females of two-spotted spider mites were sprayed with water suspension containing 0.05% of the compound formulated in wettable powder. After 3 days from spraying, the dead mites were counted and the surviving adult mites were removed. The eggs deposited during this period were maintained in contact with the spray-residues on treated leaf-surface and the percent of dead eggs was examined after 7 days from the removal of adult mites. The most of larval and mature mites hatched from viable eggs were killed by contact with the spray-residue. The residual effectiveness of the compound was examined by counting the total mortality of eggs and hatched mites after 15 days from spraying treatment. The results were as follows:

| | Percent of morality of adults after 3 days from spraying | Dead eggs after 10 days from spraying | Total mortality (percent) of eggs and hatched mites after 15 days from spraying |
|---|---|---|---|
| The compound: | | | |
| I | 100 | ++ | 100 |
| II | 17 | ++ | 100 |
| III | 0 | + | 82 |
| IV | 100 | ++ | 100 |
| V | 0 | + | 100 |
| VI | 9 | ± | 68 |
| VII | 24 | + | 100 |
| VIII | 50 | ± | 95 |

±=50, 90% killed.<br>
+=90, 99% killed.<br>
++=100% killed.

Total mortality, percent: $(a-b)/a \times 100$
  (a) Numbers of living mites in untreated plots.
  (b) Surviving mites in treated plots.

EXAMPLE VII

Potted citrus seedlings were sprayed with water suspension containing 0.025% of the compound formulated in wettable powder and infested with 30 adult females of citrus red mite on each treated leaf 2 days after spraying. After 3 days from infestation, the dead adult mites were counted and the surviving adult mites were removed. The eggs deposited during this period were maintained in contact with the spray-residues on treated leaf-surface and the percent of dead eggs was examined after 7 days from the removal of adult mites. The most of larval and mature mites hatched from viable eggs were killed by contact with spray-residue. The residual effectiveness of the compound was examined by counting the total mortality of eggs and hatched mites after 15 days from infestation. The result was as follows:

| | Percent of mortality of adults after 3 days from infestation | Percent of dead eggs | Total mortality (percent) of eggs and hatched mites after 15 days from infestation |
|---|---|---|---|
| The compound: | | | |
| I | 70 | 100 | 100 |
| II | 0 | 95 | 100 |
| III | 12 | 10 | 87 |
| IV | 0 | 75 | 100 |
| V | 11 | 86 | 100 |
| VI | 28 | 11 | 70 |
| VII | 0 | 100 | ---------- |
| VIII | 16 | 6 | 76 |

Total mortality, percent: $(a-b)/a \times 100$
  (a) Numbers of living mites in untreated plots.
  (b) Surviving mites in treated plots.

The foregoing disclosure relates only to preferred embodiments of the invention which is intended to include all changes and modifications of the examples described within the scope of the invention as set forth in the appended claims.

What we claim is:

1. The method of controlling and eradicating mites comprising applying to plants an effective amount of the compound of the formula:

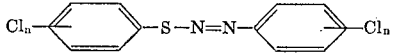

wherein $n$ represents numerals from 0 to 5.

2. The method according to claim 1, wherein the compound is 4-chlorophenyl-azo-4'-chlorophenyl-sulfide.

3. The method according to claim 1, wherein the compound is 4 - chlorophenyl-azo-2',4',5',-trichlorophenylsulfide.

4. The method according to claim 1, wherein the compound is 4-chlorophenyl-azo-2',4'-dichlorophenyl-sulfide.

5. The method according to claim 1, wherein the compound is phenyl-azo-2',4',5'-trichlorophenyl-sulfide.

6. The method according to claim 1, wherein the compound is 2,4,5-trichlorophenyl-azo-4'-chlorophenyl-sulfide.

7. The method according to claim 1, wherein the compound is phenyl-azo-2',4'-dichlorophenyl-sulfide.

8. The method according to claim 1, wherein the compound is 4-chlorophenyl-azo-phenyl-sulfide.

9. The method according to claim 1, wherein the compound is 4-chlorophenyl-2',3',4',5',6'-pentachlorophenyl-sulfide.

References Cited

FOREIGN PATENTS

| 637,138 | 12/1963 | Belgium. |
| 1,367,147 | 7/1964 | France. |
| 7,750 | 6/1963 | Japan. |
| 8,147 | 6/1963 | Japan. |

OTHER REFERENCES

Chemical Abstracts 60: P 3440d (1964).
Chemical Abstracts 60: P 459h (1964).

ALBERT T. MEYERS, *Primary Examiner.*
J. D. GOLDBERG, *Assistant Examiner.*